E. TROESCH.
DEVICE FOR SUPPORTING THE LOWER EXTREMITIES OF INVALIDS WHEN LYING DOWN.
APPLICATION FILED APR. 8, 1912.
1,118,973.  Patented Dec. 1, 1914.
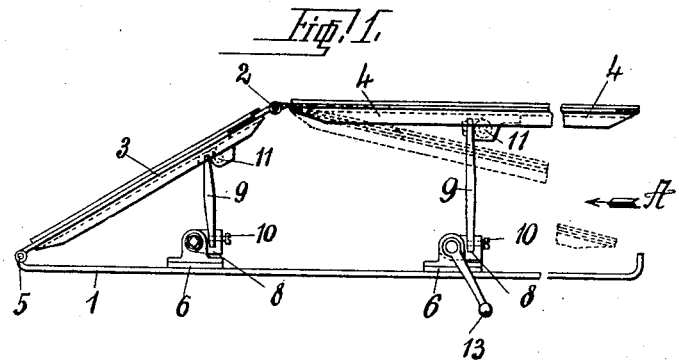
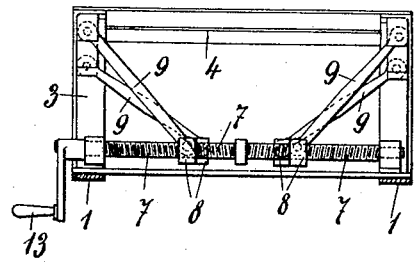
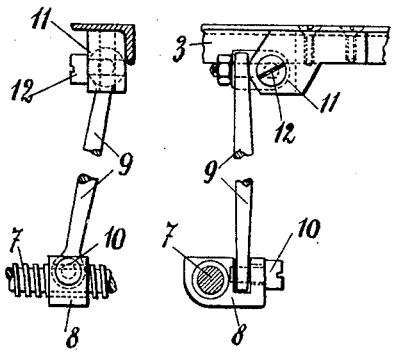
Witnesses:
Inventor
Ernst Troesch
By Oscar Geer
Attorney

UNITED STATES PATENT OFFICE.

ERNST TROESCH, OF BASEL, SWITZERLAND.

DEVICE FOR SUPPORTING THE LOWER EXTREMITIES OF INVALIDS WHEN LYING DOWN.

1,118,973.   Specification of Letters Patent.   Patented Dec. 1, 1914.

Application filed April 8, 1912. Serial No. 689,293.

*To all whom it may concern:*

Be it known that I, ERNST TROESCH, a citizen of the Swiss Republic, residing at Basel, Switzerland, have invented certain new and useful Improvements in Devices for Supporting the Lower Extremities of Invalids When Lying Down, of which the following is a specification.

This invention consists in a device for supporting the lower extremities of invalids when lying down, in which, by means of actuating mechanism two support frames arranged on a stand and movable in relation to one another are adjusted in position, and as required for the support at any time of the lower extremities without altering the position of the invalid.

One example of the invention is illustrated in the accompanying drawing.

Figure 1 is a side elevation of the device. Fig. 2 a view as seen from A in Fig. 1. Fig. 3 a view of the supports for the support frames, and Fig. 4 a side elevation of Fig. 3.

The frames 3 and 4 which are movable in relation to one another about hinges 2 are connected with the stand 1 by hinges 5. The bearings 6 are firmly connected with the stand 1 and serve for the reception of the spindles 7 that are provided with left and right screw-threads, carrying traversing nuts 8. The nuts have notches for the reception of the supports 9 which are pivotally connected to the nuts by the stud screws 10. The other ends of the supports 9 are pivotally connected by means of the stud screws 12 to the bearings 11, which are fixed on the frames 3 and 4.

The action of the device described is as follows: By means of the crank handle 13 the spindles 7 are rotated, and in consequence of their being provided with right and left screw-threads, traverse the nuts 8 on these spindles toward or apart from one another, and vary the positions of the linked supports 9, so that the frames 3 and 4 are lowered or raised, and at any time suitably to the lower extremities to be supported. The alteration in the positions can be effected at any time without lifting the supported extremities, so that no pain is caused to the invalid. The movement of the one or the other frame is sufficient for considerably affecting the position of the other frame, whereby the desired placing or supporting of the lower extremities is greatly facilitated.

What I claim and desire to secure by Letters Patent is:—

An article of the class described comprising two hinged sections, a base support hinged to one of said sections, bearings on the base support, a pair of screw spindles with right and left hand threads mounted in said bearings, a pair of traveling nuts mounted to traverse, on each spindle, links pivotally connected with the nuts and with the hinged sections and means for rotating the spindles independently to effect the adjustment of the hinged sections, substantially as described.

In testimony whereof I have affixed my signature, in presence of two witnesses.

ERNST TROESCH.

Witnesses:
 HANS CRESZPER,
 GEO. GIFFORD.

Copies of this patent may be obtained for five cents each, by addressing the "Commissioner of Patents, Washington, D. C."